(12) United States Patent
Rode

(10) Patent No.: US 6,352,267 B1
(45) Date of Patent: Mar. 5, 2002

(54) ADJUSTABY SIZEABLE RING SEAL

(76) Inventor: John E. Rode, Persse Rd., Fonda, NY (US) 12068

( * ) Notice: Subject to any disclaimer, the term of this patent is extended or adjusted under 35 U.S.C. 154(b) by 0 days.

(21) Appl. No.: 09/347,158

(22) Filed: Jul. 2, 1999

Related U.S. Application Data

(60) Provisional application No. 60/123,963, filed on Mar. 12, 1999.

(51) Int. Cl.[7] .................................................. F16J 15/02
(52) U.S. Cl. ........................................ 277/631; 277/647
(58) Field of Search ................................. 277/634, 647, 277/649

(56) References Cited

U.S. PATENT DOCUMENTS

| | | |
|---|---|---|
| 3,751,048 A | 8/1973 | Rode |
| 4,121,843 A | 10/1978 | Halling |
| 4,125,929 A | 11/1978 | Rode |
| 4,218,067 A | 8/1980 | Halling |
| 4,477,086 A | 10/1984 | Feder et al. |
| 4,589,666 A | 5/1986 | Halling |
| 4,602,888 A | 7/1986 | Court et al. |
| 4,759,555 A * | 7/1988 | Halling ........................ 277/631 |
| 4,782,738 A | 11/1988 | Jackson et al. |
| 5,435,576 A | 7/1995 | Rode |

* cited by examiner

*Primary Examiner*—Robert J. Sandy
*Assistant Examiner*—Karlena D. Schwing
(74) *Attorney, Agent, or Firm*—Heslin Rothenberg Farley & Mesiti P.C.

(57) ABSTRACT

An adjustably sizable ring seal includes a monolithic ring having a first end portion and a second overlapping end portion. The first end portion has a first cross-section and the second end portion has an integrally formed reduced cross-section slidably receivable generally within the first cross-section and/or an integrally formed radially offset cross-section slidably receivable generally within the first cross-section so that the monolithic ring seal is circumferentially expandable and contractable in size. Also disclosed is a method for forming an adjustably sizable ring seal which includes providing a continuous generally circular-shaped ring having a first cross-section, forming a portion of the ring into at least one of a reduced cross-section and a radially offset cross-section, and cutting the ring so that the ring comprises a first end portion having the first cross-section and a second end portion slidably receivable within the first cross-section so that the ring seal is circumferentially expandable and contractable in size.

18 Claims, 4 Drawing Sheets

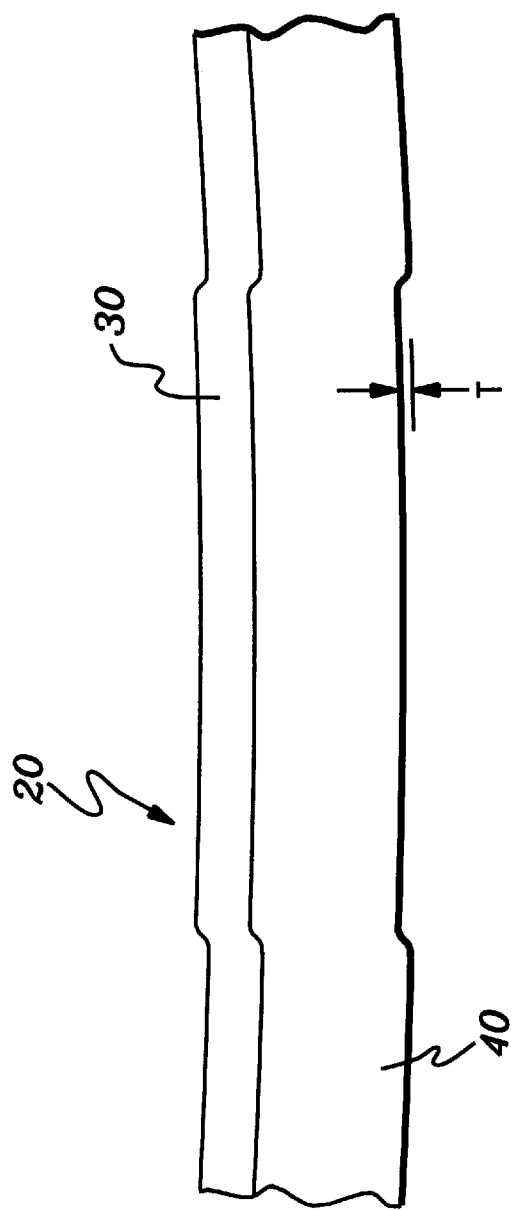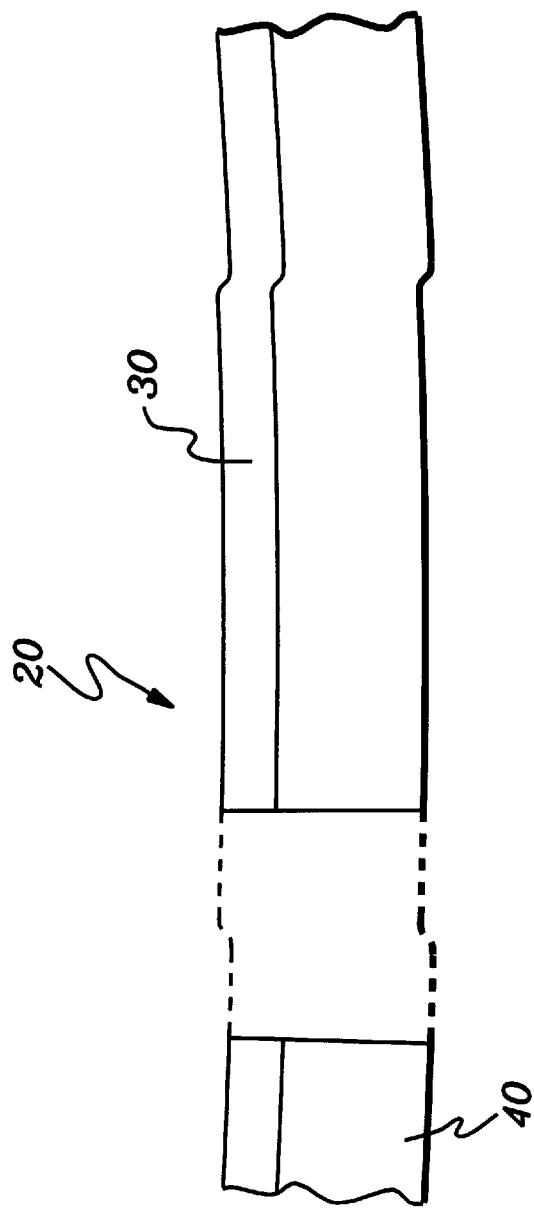

ADJUSTABY SIZEABLE RING SEAL

RELATED APPLICATION

This application claims the benefit of U.S. Provisional Application No. 60/123,963, filed Mar. 12, 1999, the contents of which are hereby incorporated by reference in its entirety into this application.

TECHNICAL FIELD

The present invention relates generally to ring seals, and more particularly to adjustably sizable ring seals.

BACKGROUND INFORMATION

Ring seals or spring gaskets are often used in various systems to provide a seal between opposing or mating surfaces to prevent pressure leakage, and particularly where high temperature and/or corrosive conditions are encountered. For example, it is now commonplace to use ring seals to minimize leakage of either compressed air or combustion products in jet engines between circumferentially-extending, spaced-apart, opposing sections of the engine.

Typically, the flanges in the jet engine where such ring seals are used are made from a multitude of segments bolted and interlocked together. Certain joints are made to fit closely and yet are slightly separated to allow for the differential thermal expansion of the various parts. Cavities between the flanges are provided to contain flexible metal ring seals to assist in forming the differing pressure boundaries.

In jet engines, between startup and elevated temperatures (e.g., about 1200 degrees F.), typically axial deflection of the mating parts is about 0.030 inch. Differential radial movements of the parts may be as much as 0.100 inch.

Of particular concern is the differential expansion of the lighter metal parts, such as the ring seals, during initial operation of the engine at which time the temperature of the ring seal may increase faster than the surrounding flange parts which typically have thicker cross-sections.

It has been conventional practice to make a circular ring seal and remove a small segment from the circumference, thus creating a gap of about ¼ to ⅜ inch between end portions of the ring seal. Such a ring seal is disclosed in applicant's earlier issued U.S. Pat. No. 3,751,048, the contents of which is incorporated herein by reference in its entirety.

The gap closes when the ring seal expands; typically when the jet engine containing the ring seal is heated rapidly, and then opens again when the temperature of the jet engine stabilizes. Undesirably, the gap allows fluid, for example lubricants, pressurized air, or combustion gases, to escape through the seal thereby resulting in leakage and loss of engine performance. However, if the gap is not provided or if improperly sized, the ring seal becomes distorted and permanently deformed when it expands during the heating portion of the cycle such that it will no longer fit closely to the flange as designed resulting in further leakage and loss of engine performance.

Other ring seals have included a ring seal element which is sized having spaced-apart end portions and a separate connecting member. The separate connecting member extends across the spaced-apart end portions of the ring seal element. The separate connecting member is typically attached to one end portion of the ring seal element by welding or riveting.

Drawbacks with the above-noted two-piece ring seal include additional manufacturing steps, e.g., separately fabricating the ring seal element and the connecting element, and additional assembly steps, e.g., aligning and attaching the connecting element to one of the end portions of the ring seal element. In addition, by welding or riveting the connecting element to the ring seal element, stresses are introduced in the ring seal which can effect the ability of the ring seal to provide a proper seal.

Therefore, there is a need for a low cost, desirably one-piece, adjustably sizable, ring seal operable to readily circumferentially expand and contract in size in response to varying operating conditions such as varying temperatures, pressures, loads, etc. while minimizing leakage of fluid through the ring seal.

SUMMARY OF THE INVENTION

The above-mentioned drawbacks are overcome by the present invention which provides an adjustably sizable ring seal comprising a monolithic ring having a first end portion having a first cross-section and a second end portion having an integrally formed reduced cross-section slidably receivable generally within the first cross-section and/or an integrally formed radially offset cross-section slidably receivable generally within the first cross-section so that the monolithic ring seal is circumferentially expandable and contractable in size.

Desirably, the ring seal is fabricated from one-piece and the first cross-section and the second cross-section comprise generally corrugated cross-sections. Advantageously, the ring seal comprises a body portion between the first end portion and the second end portion, the first end portion and the main body portion defining a gap therebetween across which the second end portion extends, and the gap being substantially closed when the ring seal is disposed in a contracted configuration between the at least two circumferentially-extending spaced-apart members In another aspect of the present invention, a method for forming an adjustably sizable ring seal includes providing a continuous generally circular-shaped ring having a first cross-section, forming a portion of the ring into at least one of a reduced cross-section and a radially offset cross-section, and cutting the ring so that the ring comprises a first end portion having the first cross-section and a second end portion slidably receivable within the first cross-section so that the ring seal is circumferentially expandable and contractable in size.

BRIEF DESCRIPTION OF THE DRAWINGS

The subject matter which is regarded as the invention is particularly pointed out and distinctly claimed in the concluding portion of the specification. The invention, however, together with further objects and advantages thereof, may best be understood by reference to the following detailed description of the preferred embodiments and the accompanying drawings in which:

FIGS. 6 and 7 are enlarged views, similar to detail 3, of the ring seal during manufacture.

DETAILED DESCRIPTION OF THE INVENTION

Figure 1:
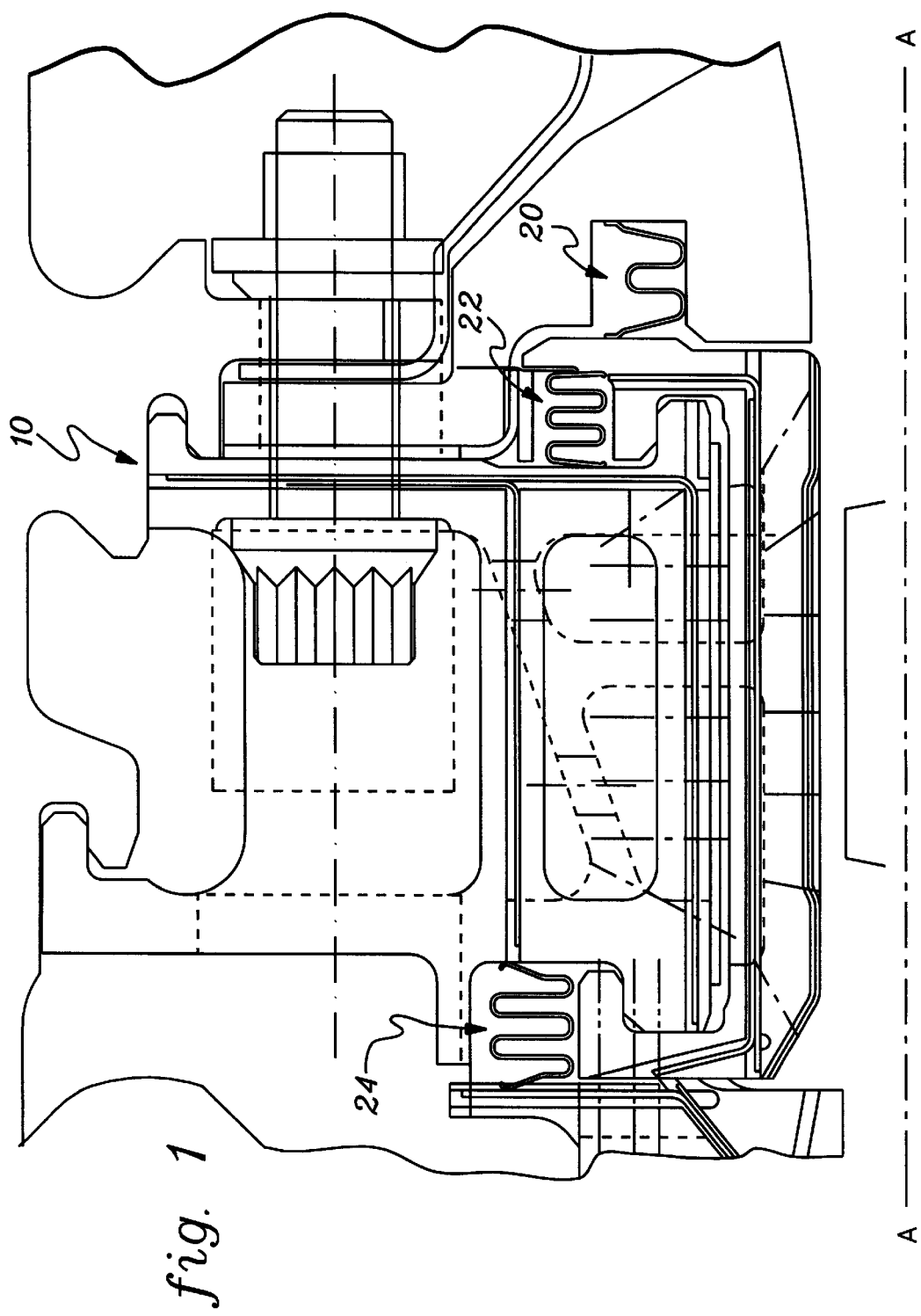
FIG. 1 is a cross-sectional view of a portion of a jet engine illustrating three adjustably sizable ring seals according to the present invention, the jet engine and ring seals being symmetric about a longitudinal axis or center line A—A.

FIG. 1 illustrates a portion of an aircraft jet engine 10 having three adjustably sizable ring seals 20, 22, and 24 according to the present invention. As described in greater detail below, ring seals 20, 22, and 24 extend circumferentially around longitudinal axis or center line A-A and are designed to adjustably conform in size and extend between and sealingly engage the various opposed or mating spaced-apart surfaces of jet engine 10 during startup, during steady state operation, and during the transition from startup to a stabilized operating temperature.

Figure 2:
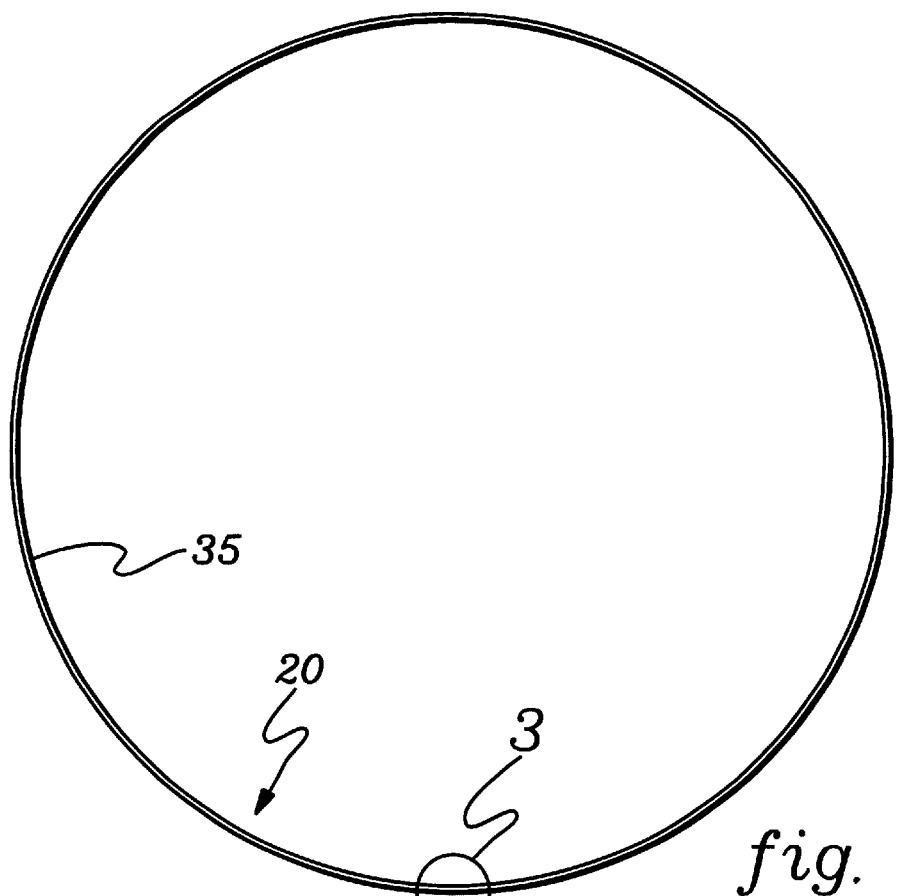
FIG. 2 is an axial view of the adjustably sizable ring seal shown in FIG. 1.
Figure 3:
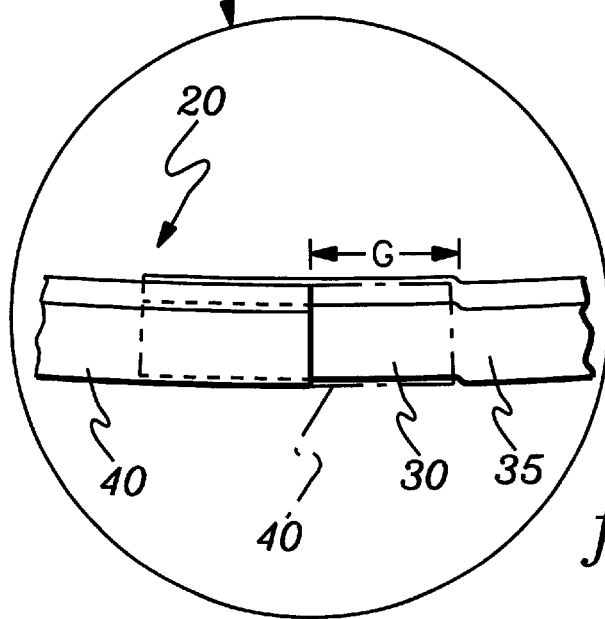
FIG. 3 is an enlarged view of detail 3 of FIG. 2 and illustrating in phantom lines, the adjustably sizable ring seal in a contracted configuration.
Figure 4:
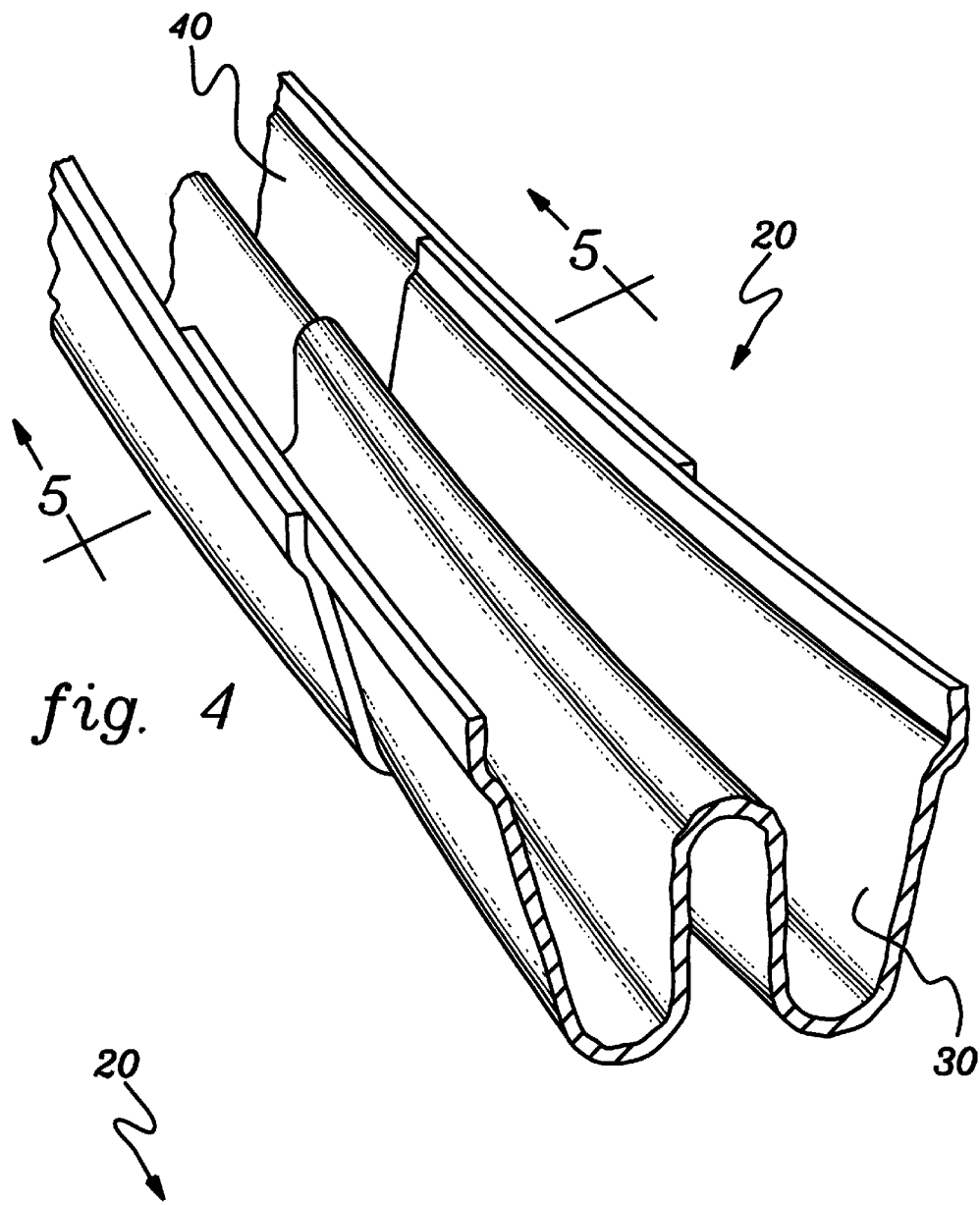
FIG. 4 is an enlarged perspective view of the overlapping end portions of the adjustably sizable ring seal shown in FIG. 2.
Figure 5:
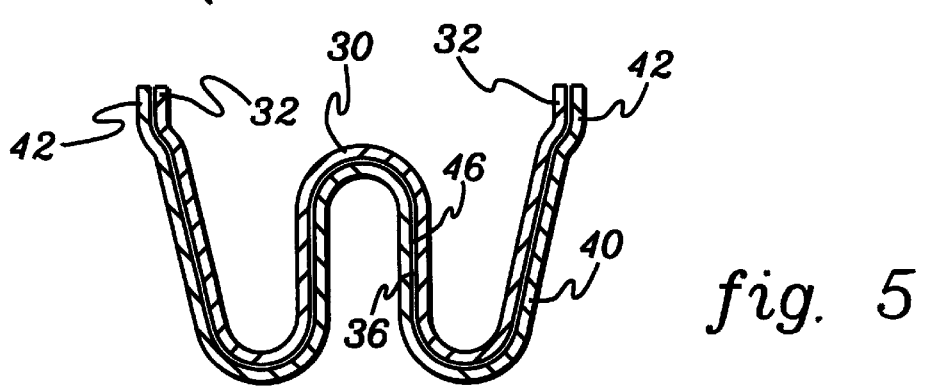
FIG. 5 is a cross-sectional view taken along line 5—5 of FIG. 4.

As best shown in FIG. 2, exemplary ring seal 20 is monolithic and includes a generally circularly-shaped configuration having a generally constant cross-section. As will be explained in greater detail below and initially with reference to FIG. 3, a small segment or end portion 30 of ring seal 20 is integrally formed and similarly shaped to a main body segment or portion 35 of ring seal 20 so that end portion 30 overlaps an end portion 40. Overlapping portions 30 and 40 allow ring seal 20 to be circumferentially expandable and As best shown in FIGS. 4 and 5, ring seal 20 and in particular, end portion 40 comprises a first generally corrugated cross-section. Ring seal 20 also includes end portion 30 which is desirably integrally formed from main body portion 35 (FIG. 3) having a reduced or smaller sized cross-section compared to main portion 35 and end portion 40 of ring seal 20 so that end portion 30 is slidably receivable to fit within the inside generally concave and convex surface(s) of end portion 40. In addition, end portion 30 is desirably radially offset as shown in FIG. 3, e.g., the thickness of the material forming ring seal 20, so that an outer surface 36 of end portion 30 aligns with and is slidably receivable within an inner surface 46 of end portion 40.

With reference again to FIG. 3, end portion 30 may be formed with an arc length equal to a gap G (typically required of a conventional split ring seal so that adequate clearance is provided during the varying ranges of temperature, pressure, loads, etc. that the ring seal will experience) plus an overlap amount which may be equal to or greater than gap G itself. For example, ring seal 20 is desirably sized and configured for use between at least two circumferentially-extending spaced-apart members (not shown in FIG. 3) so that gap G is substantially closed when ring seal is disposed in a contracted configuration (as illustrated in phantom lines in FIG. 3) between the at least two circumferentially-extending spaced-apart members. Such a configuration for ring seal 20 optimizes the sealing capability of ring seal 20, and thus, minimizes leakage of fluid across seal 20.

When ring seal 20 is installed between the various circumferentially-extending opposed surfaces of an aircraft engine, end portion 30 is inserted into the opposite end portion 40 of ring seal 20 thereby generally eliminating the gap between end portion 30 and end portion 40 when engine heating occurs. Gap G (FIG. 3) further closes as end portion 30 slides into and further engages end portion 40 such that the intersection of main body portion 35 and end portion 30 moves closer to end portion 40. As temperature conditions in the jet engine stabilize, gap G increases in size. Advantageously, end portion 30 blocks most of the opening that would normally occur (without end portion 30) when main body portion 35 moves back away from end portion 40.

Engine pressures across ring seal 20 may vary from a 10 to 30 psi (pounds per square inch) differential to as mush as a 100 to 500 psi differential. It is of particular importance to close the gap when the pressure is in the highest ranges where the amount of fluid loss will be the greatest. Desirably, the ring seal of the present invention may be formed from an alloy such as a nickel alloy (e.g., INCONEL 718) strip material having a 0.010 inch thickness.

Pressure forces push the lateral segments or portions 32 and 42 (FIG. 5) of ring seal 20 towards the circumferentially-extending opposed portions of the aircraft engine to be sealed. Circumferential forces causing the closure of the gasket gap are desirably sufficient to wedge end portion 40 between end portion 30 and the circumferentially-extending opposed portions of the aircraft engine. This is made easier by forming a wedge shape or knife-edge on end portion 40. Desirably, end portion 30 may be formed having a slightly smaller radius or cross-section than end portion 40 so that end portion 30 fits inside end portion 40 to facilitate sliding of end portion 30 against the inner surface of end portion 40 under pressure. Ring seals of this type may be designed to be compressed with minimal forces so as to not damage the lightweight circumferentially-extending opposed portions of the aircraft engine. It will also be appreciated that the ring seal may be oversized and shaped to so that the ring seal is compressed between the circumferentially-extending surfaces of the engine.

Ring seal 20 may be roll formed from a welded circular strip and then strengthened by precipitation hardening. The creation of the gap, cutting the circular strip to form the overlapping end portions as discussed below, may be done before or after heat treatment. The ring seal of the present invention may also be used with ring seal configurations that are not welded continuous circles as, for example, extruded shapes.

For example, one method of fabricating ring seal 20 is to roll form a welded continuous circle of a resilient ductile metal strip with successive forming rolls until the desired cross-section is -achieved. Several dozen formed ring seals may be held in a stack by wrapping with a thin metal band and then heat treating. The band serves the purpose of keeping the stack of rings in a circular shape during heat treatment.

Typical heat treatment consists of solution treating in a vacuum furnace at about 1700 degrees F followed by a precipitation aging cycle at about 1400 degrees F. for about 20 hours. Other heat treatment cycles may also be possible. Heat treating the ring seals individually or after they are cut to provide the gap (e.g., as explained below) presents difficulties in maintaining the circular shape or flat plane shape of the ring seals.

This exemplary method for forming ring seal 20, and in particular end portion 30, desirably initially includes ring seal 20 formed into a continuous loop or circle so that it may be heat treated as a continuous circle. To accomplish this, the continuous circular-shaped ring seal is made about one inch larger in circumference than required for sealing the circumferentially-extending opposed portions of the jet engine.

As shown in FIG. 6, a set of pressing tools (not shown) may be used to press and integrally form end portion 30, e.g., a one-inch segment of the circular ring seal, into a smaller reduced size cross-section and desirably radially offset (e.g., offset distance T) relative to the cross-section of the main body portion. Desirably, the integrally formed end portion 30 in ring seal 20 is formed prior to heat treatment.

After heat treatment, the circular ring seal is cut to remove a portion thereof, e.g., about a ¼ inch section, as shown in FIG. 7. The edge of end portion 40 may be further prepared by beveling the edge to encourage sliding of the end portion 30 into end portion 40. The ring seal is then radially compressed so that end portion 30 slides into end portion 40 as shown in FIG. 3, and thus, the adjustably sizable ring seal is formed as depicted in FIG. 2. As described above, the formed resilient adjustably sizable ring seal may then be readily inserted within the circumferentially-extending opposed surfaces of an aircraft engine as shown in FIG. 1.

A modification of the present invention may be achieved by cutting a short circumferential slot from the end of the smaller section central to the center convolute about half of the segment length of the smaller section to reduce the compression force at the overlapping portion of gasket. Further modification can be seen for multi-convoluted gasket springs treated in a comparable manner.

While the ring seal of the present invention has been described and illustrated as being of one-piece construction, it will be appreciated by those skilled in the art that the ring seal may be configured with two or more section of overlapping portions according to the present invention so as to have a plurality of overlapping portions or splices.

The ring seal of the present invention is readily manufactured and provides a ring seal having a reduced sized gap in use over the various changes in temperature, pressure, heating, etc. while at the same time resisting permanent deformation due to such changes.

Thus, while various embodiments of the present invention have been illustrated and described, it will be appreciated to those skilled in the art that many changes and modifications may be made thereunto without departing from the spirit and scope of the invention.

What is claimed is:

1. An adjustably sizable ring seal comprising:
   a monolithic ring having a first end portion having a first cross-section and a second end portion having at least one of an integrally formed reduced cross-section slidably receivable generally within said first cross-section and an integrally formed radially offset cross-section slidably receivable generally within said first cross-section so that said monolithic ring seal is circumferentially expandable and contractable in size.

2. The adjustably sizable ring seal of claim 1 wherein said second end portion comprises an integrally formed reduced cross-section.

3. The adjustably sizable ring seal of claim 1 wherein said second end portion comprises an integrally formed radially offset cross-section.

4. The adjustably sizable ring seal of claim 1 wherein said second end portion comprises an integrally formed reduced and radially offset cross-section.

5. The adjustably sizable ring seal of claim 1 wherein said ring further comprises a body portion between said first end portion and said second end portion, said first end portion and said body portion defining a gap therebetween across which said second end portion extends, and said gap being substantially closed when said ring seal is disposed in a contracted configuration between at least two circumferentially-extending spaced-apart members.

6. The adjustably sizable ring seal of claim 1 wherein said first end portion comprises an inner surface, said second portion comprises an outer surface, and said outer surface being slidably receivable within said inner surface.

7. The adjustably sizable ring seal of claim 1 wherein said first cross-section and at least one of said reduced cross-section and said radially offset generally comprise corrugated cross-sections.

8. The adjustibly sizable ring seal of claim 1 wherein said ring is formed from a metal.

9. The adjustably sizable ring seal of claim 8 wherein said metal is a nickel alloy.

10. A method for sealing at least two circumferentially-extending spaced-apart members, the method comprising:
    providing an adjustably sizeable ring seal of claim 1; and
    placing the ring seal between the at least two circumferentially extending spaced-apart members.

11. A method for forming an adjustably sizable ring seal, the method comprising;
    providing a continuous generally circular-shaped ring having a first cross-section;
    forming a portion of the ring into at least one of a reduced cross-section and a radially offset cross-section; and
    cutting the ring so that the ring comprises a first end portion having the first cross-section and a second end portion slidably receivable within the first cross-section so that the ring seal is circumferentially expandable and contractable in size.

12. The method of claim 11 wherein forming the second end portion comprises forming the second end portion into a reduced cross-section.

13. The method of claim 11 wherein forming the second end portion comprises forming a radially offset cross-section.

14. The method of claim 11 wherein forming the second end portion comprises forming the second end portion into a reduced and radially offset cross-section.

15. The method of claim 11 wherein the ring further comprises a body portion between the first end portion and the second end portion, the first end portion and the body portion defining a gap therebetween across which the second end portion extends, and the gap being substantially closed when the ring seal is disposed in a contracted configuration between at least two circumferentially-extending spaced-apart members.

16. The method of claim 11 further comprising heat treating the ring prior to cutting the ring.

17. A method for forming an adjustably sizable ring seal, the method comprising;
    providing a monolithic ring having a first end portion having a first cross-section and a second end portion;
    forming the second end portion into at least one of a reduced cross-section slidably receivable generally within the first cross-section and a radially offset cross-section slidably receivable generally within the first cross-section so that the monolithic ring seal is circumferentially expandable and contractable in size.

18. A portion of an adjustably sizable ring seal comprising:
    a monolithic member having a first cross-section and integrally formed therewith at least one of a reduced cross-section and a radially offset cross-section.

* * * * *